(12) United States Patent
Yugo

(10) Patent No.: US 8,917,039 B2
(45) Date of Patent: Dec. 23, 2014

(54) CAR POWER SOURCE APPARATUS AND VEHICLE EQUIPPED WITH THE POWER SOURCE APPARATUS

(71) Applicant: Sanyo Electric Co., Ltd., Moriguchi, Osaka (JP)

(72) Inventor: Masaki Yugo, Kakogawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 189 days.

(21) Appl. No.: 13/658,243

(22) Filed: Oct. 23, 2012

(65) Prior Publication Data
US 2013/0106320 A1 May 2, 2013

(30) Foreign Application Priority Data

Oct. 27, 2011 (JP) .................. 2011-236416

(51) Int. Cl.
| | | |
|---|---|---|
| H02P 7/00 | (2006.01) | |
| B60L 3/00 | (2006.01) | |
| B60L 3/04 | (2006.01) | |
| B60L 11/18 | (2006.01) | |
| H02J 1/08 | (2006.01) | |
| H02J 7/34 | (2006.01) | |
| H02J 1/00 | (2006.01) | |
| H02J 7/00 | (2006.01) | |

(52) U.S. Cl.
CPC ................. *H02P 7/00* (2013.01); *B60L 3/0092* (2013.01); *B60L 3/0046* (2013.01); *B60L 3/0084* (2013.01); *B60L 3/04* (2013.01); *B60L 11/1853* (2013.01); *B60L 11/1868* (2013.01); *H02J 1/08* (2013.01); *Y02T 10/7005* (2013.01); *H02J 7/345* (2013.01); *H02J 2001/008* (2013.01); *H02J 2007/0095* (2013.01); *Y02T 10/7066* (2013.01)
USPC ................. 318/139; 318/34; 318/558

(58) Field of Classification Search
CPC .......................................................... H02P 7/00
USPC ............................................. 318/139, 34, 558
See application file for complete search history.

(56) References Cited

U.S. PATENT DOCUMENTS

| | | | | |
|---|---|---|---|---|
| 5,780,980 A | * | 7/1998 | Naito | 318/139 |
| 5,796,175 A | | 8/1998 | Itoh et al. | |
| 6,422,331 B1 | * | 7/2002 | Ochiai et al. | 180/65.25 |

(Continued)

FOREIGN PATENT DOCUMENTS

| | | |
|---|---|---|
| DE | 100 53 169 | 6/2001 |
| DE | 103 04 764 | 2/2004 |

(Continued)

OTHER PUBLICATIONS

Extended European Search Report issued Apr. 11, 2014 in corresponding European patent application No. 12 19 0033.

*Primary Examiner* — David S Luo
(74) *Attorney, Agent, or Firm* — Wenderoth, Lind & Ponack, L.L.P.

(57) ABSTRACT

The car power source apparatus is provided with a driving battery having a plurality of connected batteries, battery-switches that connect the driving battery to the vehicle-side load, a control circuit that controls the battery-switches, and an auxiliary battery that supplies operating power to the control circuit power supply line. The power source apparatus is provided with a supplementary power supply circuit that supplies operating power to the control circuit power supply line from batteries in the driving battery to maintain control circuit operation in the event of an auxiliary battery voltage drop condition. In an auxiliary battery voltage drop condition, the supplementary power supply circuit supplies operating power to the control circuit power supply line and maintains control circuit operation to maintain control of the battery-switches.

17 Claims, 5 Drawing Sheets

(56) References Cited

U.S. PATENT DOCUMENTS

| | | | |
|---|---|---|---|
| 6,752,226 B2 * | 6/2004 | Naito et al. | 180/65.26 |
| 6,982,499 B1 | 1/2006 | Kachi et al. | |
| 7,669,676 B2 * | 3/2010 | Miller | 180/65.265 |
| 2006/0110655 A1 | 5/2006 | Wirdel | |
| 2011/0101774 A1 | 5/2011 | Wagner | |

FOREIGN PATENT DOCUMENTS

| | | |
|---|---|---|
| DE | 10 2008 001 145 | 10/2009 |
| JP | 2005-269742 | 9/2005 |

* cited by examiner

CAR POWER SOURCE APPARATUS AND VEHICLE EQUIPPED WITH THE POWER SOURCE APPARATUS

BACKGROUND OF THE INVENTION

1. Field of the Invention

The present invention relates to a car power source apparatus and vehicle equipped with the power source apparatus, which is provided with battery-switches (e.g. relays or high power semiconductor switching devices) that connect the driving battery to the load, and a control circuit that controls the battery-switches.

2. Description of the Related Art

A car power source apparatus has battery-switches installed between the driving battery and the vehicle-side load (refer to Japanese Laid-Open Patent Publication 2005-269742).

The battery-switches are switched ON when the vehicle ignition switch (ignition key) is turned ON, and switched OFF when the ignition switch is turned OFF. Battery-switches in the ON state connect the driving battery to the vehicle-side load. The vehicle-side load includes a driving motor and generator connected via a direct current to alternating current (DC/AC) inverter. With the battery-switches in the ON state, the driving battery supplies power through the DC/AC inverter to the motor to drive the vehicle. Further, generator output charges the driving battery through the DC/AC inverter with the battery-switches in the ON state.

The battery-switches are controlled ON and OFF by a control circuit. The control circuit switches the battery-switches ON when it detects the ignition switch in the ON state, and switches the battery-switches OFF when it detects the ignition switch in the OFF state. In addition, the control circuit turns the battery-switches OFF when abnormal conditions are detected in the driving battery or vehicle. A control circuit that performs these functions is supplied with operating power from an auxiliary battery, which in almost all vehicles is a 12V lead-storage battery.

The auxiliary battery supplies power to various vehicle electrical components and accessories such as the power steering system and the (engine) starter motor. Consequently, when the power steering system or starter motor discharges high current from the auxiliary battery, the voltage of the auxiliary battery can drop temporarily. In particular, when the power steering system or starter motor discharges high current from an already degraded auxiliary battery, auxiliary battery voltage can drop markedly. The auxiliary battery is charged with power generated by an alternator, which is rotated by the engine, or by voltage stepped-down from driving battery output by a direct current to direct current (DC/DC) converter. However, since the charging current is limited to a constant specified current, extremely high load currents can cause the auxiliary battery voltage to drop. Further, when the auxiliary battery is in an uncharged state and the power steering system or starter motor pulls high current from the battery, its voltage will drop drastically. If auxiliary battery voltage drops drastically, control circuit operation can become unstable or the control circuit can become inoperable. When the control circuit fails to operate properly, the battery-switches cannot be controlled ON and OFF in the normal manner. In this situation, the battery-switches cannot be maintained in the ON state even though the ignition switch is turned ON, and power cannot be supplied normally from the driving battery to the motor.

The present invention was developed with the object of correcting the detrimental situation described above. Thus, it is an object of the present invention to provide a car power source apparatus and vehicle equipped with the power source apparatus, which is not affected by auxiliary battery voltage drop and can always maintain proper operation of the control circuit. It is another object of the present invention to provide a car power source apparatus and vehicle equipped with the power source apparatus, which does not require a dedicated power supply to keep the control circuit operating when power supply line voltage drops, but rather maintains control circuit operation with power from one segment of the driving battery. It is another object of the present invention to provide a car power source apparatus and vehicle equipped with the power source apparatus, which can set the voltage of power supplied to the control circuit to an optimum voltage and can supply operating power from the driving battery at the optimum control circuit voltage when power supply line voltage drops.

SUMMARY OF THE INVENTION

The car power source apparatus of the present invention is provided with a driving battery 1 having a plurality of batteries 10 connected in series to supply power to the vehicle driving motor 32, battery-switches 2 that connect the driving battery 1 to the vehicle-side load 30, a control circuit 4 that controls the battery-switches 2, and an auxiliary battery 35 that supplies operating power to the control circuit 4 power supply line 5. Further, the car power source apparatus is provided with a supplementary power supply circuit 6 that supplies operating power to the control circuit 4 power supply line 5 from a segment of batteries 10 that make up the driving battery 1 and maintains control circuit 4 operation in the event of voltage drop in power supplied to the control circuit 4 power supply line 5 from the auxiliary battery 35. The supplementary power supply circuit 6 supplies operating power to the control circuit 4 power supply line 5 at the control circuit 4 operating voltage from one segment of the series-connected batteries 10 that make up the driving battery 1. In the event of auxiliary battery 35 voltage drop, the car power source apparatus maintains control circuit 4 operation to control the battery-switches 2.

The car power source apparatus described above has the characteristic that even if auxiliary battery voltage drops abnormally, control circuit operation can be consistently maintained and the battery-switches can be properly controlled. This is because the supplementary power supply circuit supplies operating power from the driving battery to the control circuit power supply line if auxiliary battery voltage drops temporarily. Consequently, the car power source apparatus described above can properly control the battery-switches with a normally operating control circuit even when a high load temporarily reduces the auxiliary battery voltage.

The car power source apparatus described above also has the characteristic that it does not require a dedicated power supply to keep the control circuit operating when power supply line voltage drops, but rather maintains control circuit operation with power from one segment of the driving battery. This is because the driving battery has a plurality of batteries connected in series, and the power supplied to the control circuit power supply line can be set to an optimum voltage by the number of series-connected batteries used. In general, a lead-storage battery with a specified voltage of 12V is used as the auxiliary battery. In contrast, nickel hydride batteries or lithium ion batteries are used in the driving battery. Nickel hydride batteries have a specified voltage of 1.2V, and lithium ion batteries have a specified voltage of 3.7V. Therefore, a supplementary power supply circuit that supplies power to the control circuit from a series-connection of nine nickel hydride batteries can have a nominal supply voltage of 10.8V, and a supplementary power supply circuit with ten series-connected nickel hydride batteries can have a nominal supply voltage of 12V. A supplementary power supply circuit that supplies the control circuit with power from three series-connected lithium ion batteries has a nominal supply voltage of 11.1V. Consequently, for a power source apparatus with nickel hydride batteries in the driving battery, control circuit operation can be maintained by a supplementary power supply circuit that supplies 10.8V to 12V power to the control circuit power supply line from nine to ten series-connected batteries. For a power source apparatus with lithium ion batteries in the driving battery, control circuit operation can be maintained by a supplementary power supply circuit that supplies 11.1V power to the control circuit power supply line from three series-connected batteries. The control circuit can operate on a nominal supply voltage of 11.1V. The nominal supply voltage of the supplementary power supply circuit can be set to the optimum voltage by selecting the number of series-connected batteries. As a result, control circuit operation can be maintained by supplying power to the control circuit power supply line directly from a segment of batteries in the driving battery without any voltage adjustment using circuitry such as a DC/DC converter.

In the event of auxiliary battery voltage drop in the car power source apparatus described above, the supplementary power supply circuit supplies power to the control circuit from one segment of batteries that make up the driving battery. Accordingly, by proper selection of the number of series-connected batteries in the supplementary power supply circuit, the voltage of power supplied to the control circuit power supply line can be set to an optimum value. Therefore, the supplementary power supply circuit can supply control circuit operating power from the driving battery at a voltage, which is optimal for control circuit operation, and can maintain control circuit operation at the nominal voltage of the auxiliary battery.

The car power source apparatus described above only supplies operating power to the control circuit from the driving battery temporarily when auxiliary battery voltage drops. Over-discharging and remaining capacity disparity between batteries do not occur in the driving battery by supplying power to the control circuit from one segment of batteries. This is because the driving battery segment is only discharged in the event of auxiliary battery voltage drop.

In the car power source apparatus of the present invention, the supplementary power supply circuit 6 can be provided with supplementary power switches 7 that connect one segment of the driving battery 1 with the control circuit 4 power supply line 5, and the supplementary power switches 7 can be switched ON to supply operating power to the control circuit 4 power supply line 5 from one segment of batteries 10 in the driving battery 1 when auxiliary battery 35 voltage drops. In this power source apparatus, operating power is supplied from the driving battery to the control circuit by switching the supplementary power switches ON during auxiliary battery voltage drop, and operating power is supplied from the auxiliary battery to the control circuit by switching the supplementary power switches OFF when auxiliary battery voltage is normal.

In the car power source apparatus of the present invention, the specified voltage of the supplementary power supply circuit 6 for power supplied from the driving battery 1 to the control circuit 4 power supply line 5 can be lower than the specified voltage of the auxiliary battery 35. In this power source apparatus, operating power can be supplied from the driving battery to the control circuit during auxiliary battery voltage drop with a simple circuit structure. This is because when power is supplied from the driving battery to the control circuit, voltage in the power supply line is lower than the specified voltage of the auxiliary battery. If auxiliary battery voltage drops, power supply line voltage becomes lower than the specified voltage of the auxiliary battery and power is supplied from the driving battery to the control circuit, but the power supply line voltage does not become greater than the specified voltage of the auxiliary battery. Consequently, the auxiliary battery voltage drop condition can be detected while operating power is being supplied from the driving battery to the control circuit, and the return of normal voltage in the auxiliary battery can be reliably detected allowing operating power to again be supplied to the control circuit from the auxiliary battery.

In the car power source apparatus of the present invention, the supplementary power supply circuit 6 can be provided with supplementary power switches 7 that are switched ON if auxiliary battery 35 voltage drops, a voltage detection circuit 8 that detects the voltage on the control circuit 4 power supply line 5 or the voltage of the auxiliary battery 35, and a decision circuit 9 that judges a voltage drop condition when the voltage detected by the voltage detection circuit 8 is below a set voltage and judges normal conditions when the detected voltage is above a set voltage. In a voltage drop condition, the decision circuit 9 can switch ON the supplementary power switches 7 to supply operating power from one segment of the driving battery 1 to the control circuit 4 power supply line 5. Under normal conditions, the decision circuit 9 can put the supplementary power switches 7 in the OFF state to supply operating power from the auxiliary battery 35 to the control circuit 4 power supply line 5. When this power source apparatus is in the auxiliary battery voltage drop condition, the supplementary power switches are switched ON and operating power is supplied to the control circuit from the driving battery, and under normal conditions, operating power is supplied to the control circuit only from the auxiliary battery. Consequently, operating power is supplied to the control circuit from the driving battery only when auxiliary battery voltage drops, and under normal conditions, no driving battery power is consumed by the control circuit.

In the car power source apparatus of the present invention, the set voltage for decision circuit 9 discrimination between the voltage drop condition and normal conditions can be set higher than the specified supply voltage of the supplementary power supply circuit 6 and set lower than the specified voltage of the auxiliary battery 35. In this power source apparatus, when the voltage of the auxiliary battery drops below the set voltage, which is set higher than the specified supply voltage of the driving battery segment of the supplementary power supply circuit, the supplementary power switches are switched ON and operating power is supplied to the control circuit from the driving battery. In this state, operating power is supplied to the control circuit power supply line from the driving battery to make the control circuit operational. Under these conditions, since the voltage of power supplied from the driving battery to the control circuit is lower than the set voltage, the supplementary power switches are held in the ON state to supply operating power from the driving battery to the control circuit. When the auxiliary battery voltage rises above the set voltage and conditions allow operating power to be supplied to the control circuit from the auxiliary battery, the supplementary power switches are switched OFF and power supplied to the control circuit from the driving battery is cut-off.

In the car power source apparatus of the present invention, an electrolytic capacitor 15 can be connected to the control circuit 4 power supply line 5, and an analog-to-digital (A/D) converter 13 can be provided in the voltage detection circuit 8 to detect power supply line 5 or auxiliary battery 35 voltage with a given sampling period. The decision circuit 9 can discriminate between the voltage drop condition and normal condition based on the digital signal output from the A/D converter 13, and the specified supply voltage of the supplementary power supply circuit 6 can be set lower than the specified voltage of the auxiliary battery 35. When the decision circuit 9 judges an auxiliary battery voltage drop condition, the supplementary power switches 7 can be switched ON and maintained in the ON state for a given period, and in that state, the A/D converter 13 can detect the power supply line 5 or auxiliary battery 35 voltage with a given sampling period. The decision circuit 9 can determine the change in detected voltage, can discriminate between the voltage drop condition and normal condition from the change in detected voltage, and can control the supplementary power switches 7 ON and OFF accordingly. In the power source apparatus described above, when auxiliary battery voltage has dropped and the supplementary power switches have been switched ON, the decision circuit detects the change in voltage of the power supply line or auxiliary battery to discriminate between the voltage drop condition and normal condition. This allows accurate judgment of the voltage drop condition and normal condition. If auxiliary battery voltage returns to the normal state from the voltage drop condition where the supplementary power switches have been switched ON, operating power will be supplied to the control circuit from the auxiliary battery. This is because the specified voltage of the auxiliary battery is set higher than the specified supply voltage of the supplementary power supply circuit and the power supply line voltage rises gradually from the specified voltage of the supplementary power supply circuit to the specified voltage of the auxiliary battery.

In the car power source apparatus of the present invention, the specified voltage of the supplementary power supply circuit 6 can be lower than the specified voltage of the auxiliary battery 35, and the supplementary power supply circuit 6 can supply power to the control circuit 4 power supply line 5 from one segment of batteries 10 in the driving battery 1 through a diode 17. Further, the auxiliary battery 35 can supply operating power to the control circuit 4 power supply line 5 through another diode 16. In this power source apparatus, operating power is supplied to the control circuit power supply line from the supplementary power supply circuit and auxiliary battery through diodes. In the auxiliary battery voltage drop condition, power is supplied to the control circuit from the supplementary power supply circuit, which is one segment of the driving battery, through a diode, and under normal conditions, power is supplied to the control circuit from the auxiliary battery through a diode. Consequently, there is no need for switches to control power supplied from the driving battery to the control circuit, and in the voltage drop condition, operating power can be supplied to the control circuit from the driving battery with a simple circuit structure. Further, in the voltage drop condition, no power is supplied from the driving battery to the auxiliary battery, and under normal conditions, no power is supplied from the auxiliary battery to the driving battery.

In the car power source apparatus of the present invention, the control circuit 4 power supply line 5 is connected to the auxiliary battery 35 through a diode 16, and the diode 16 is connected with a polarity that only allows power to be supplied from the auxiliary battery 35 to the power supply line 5 and does not allow power to be supplied from the power supply line 5 to the auxiliary battery 35.

The vehicle of the present invention is provided with any one of the power source apparatus cited above. The above and further objects of the present invention as well as the features thereof will become more apparent from the following detailed description to be made in conjunction with the accompanying drawings.

DETAILED DESCRIPTION OF THE EMBODIMENTS

The following describes embodiments of the present invention based on the figures.

Figure 1:
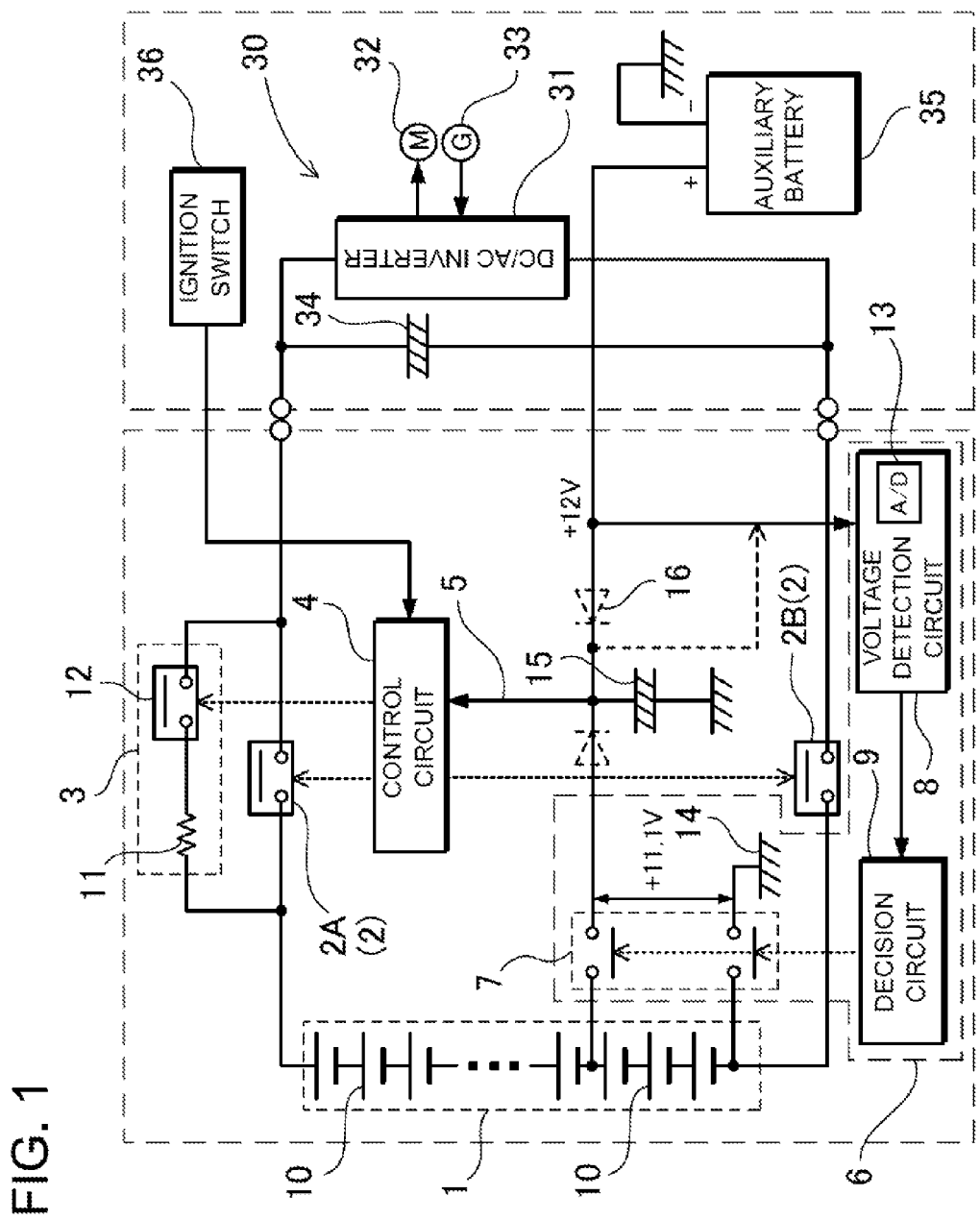
FIG. 1 is a block diagram of a car power source apparatus for an embodiment of the present invention.
Figure 2:
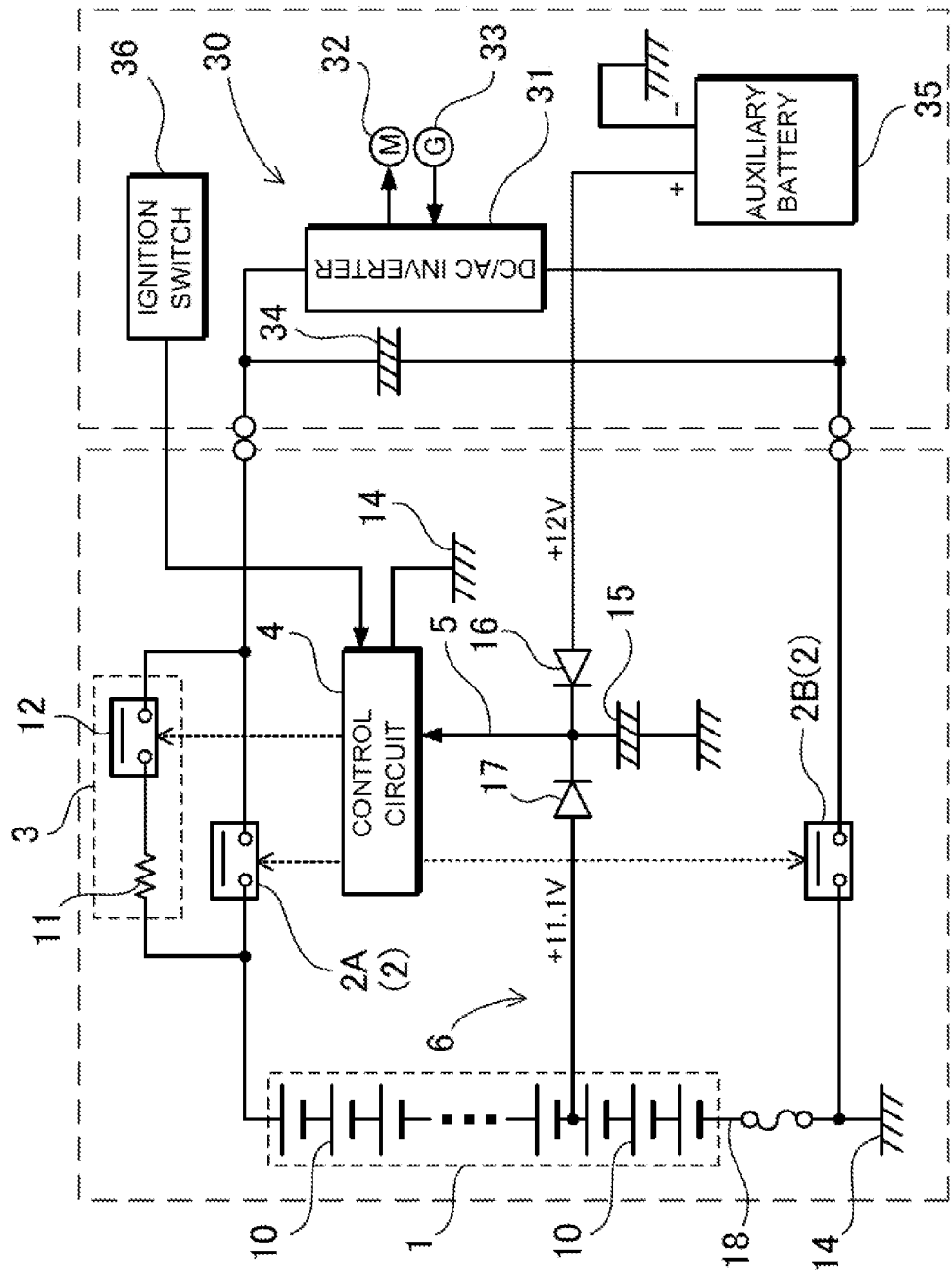
FIG. 2 is a block diagram of a car power source apparatus for another embodiment of the present invention.
Figure 3:
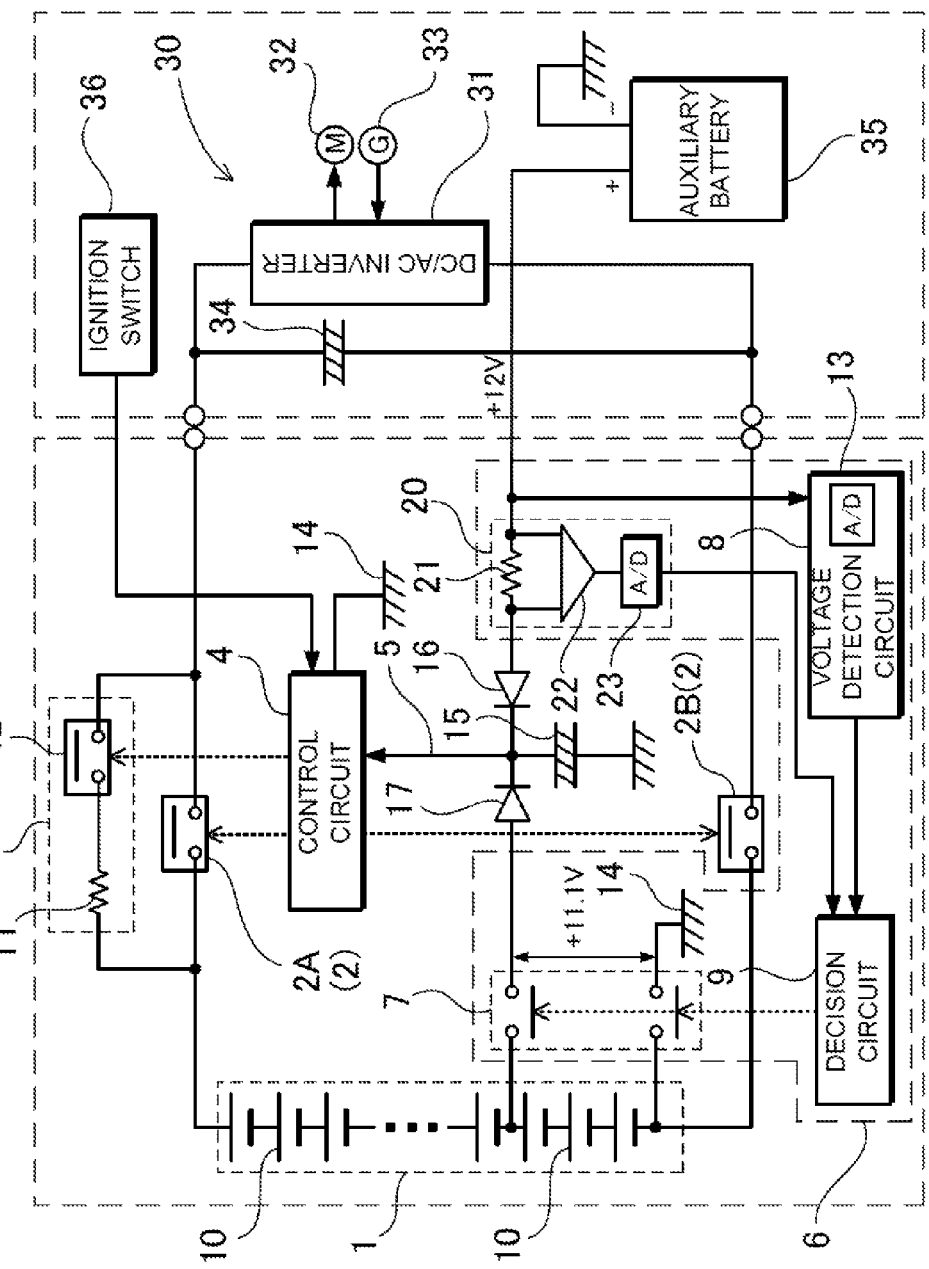
FIG. 3 is a block diagram of a car power source apparatus for another embodiment of the present invention.

The car power source apparatus shown in FIGS. 1-3 is installed on-board a hybrid vehicle (hybrid car, hybrid electric vehicle, HEV) or on-board an electric vehicle (EV, electric automobile, electric car). The power source apparatus driving battery 1 is connected to the vehicle-side load 30 via battery-switches 2. The vehicle-side load 30 has an electric motor 32 and generator 33 connected through a DC/AC inverter 31. The power source apparatus connects the driving battery 1 to the motor 32 to drive the vehicle via the motor 32. The power source apparatus in the figures is provided with a driving battery 1, battery-switches 2 connected on the output-side of the driving battery 1 to control power supplied to the vehicle-side load 30, a pre-charge circuit 3 to pre-charge a capacitor 34 in the vehicle-side load 30 prior to switching the battery-switches 20N, a control circuit 4 to control the battery-switches 2 and pre-charge circuit 3, an auxiliary battery 35 that supplies operating power to the control circuit 4 power supply line 5, and a supplementary power supply circuit 6 that supplies operating power to the control circuit 4 when the auxiliary battery 35 is in a low voltage (voltage drop) condition.

The vehicle-side load 30 has a capacitor 34 with high capacitance connected in parallel. With the battery-switches 2 in the ON state, power is supplied to the vehicle-side load 30 from both the driving battery 1 and the capacitor 34. In particular, the capacitor 34 can deliver high instantaneous power to the vehicle-side load 30. Accordingly, by connecting a large capacitor 34 in parallel with the driving battery 1, higher instantaneous power can be supplied to the vehicle-side load 30. Since the power that can be supplied to the vehicle-side load 30 from the capacitor 34 is proportional to the capacitance, a capacitor 34 with extremely high capacitance, such as 4000 g to 6000 g, is used. If the high capacitance capacitor 34 is connected to the high output voltage driving battery 1 in the discharged state, excessive instantaneous current will flow. This is because the capacitor 34 impedance is extremely low.

The driving battery 1 powers the electric motor 32 that drives the vehicle. To enable high power to be supplied to the motor 32, driving battery 1 output voltage is made high by the series-connection of a plurality of batteries 10 that can be charged. The batteries 10 are either nickel hydride batteries, lithium ion batteries, or lithium polymer batteries. However, any batteries that can be charged, such as nickel cadmium batteries, can be used as the batteries. To supply high power to the motor 32, driving battery 1 output voltage is a high voltage such as 100V to 400V. However, the power source apparatus can also supply power to the vehicle-side load while boosting the driving battery voltage through the DC/AC inverter 31. In that case, the number of series-connected batteries can be reduced and driving battery output voltage can be lowered. For example, driving battery output voltage can be 50V to 300V with voltage boost via the DC/AC inverter.

The battery-switches 2 are relays with mechanically moving contacts or high power (high current capacity) semiconductor switching devices such as insulated-gate bipolar transistors (IGBT). A first battery-switch 2A (the positive-side battery-switch 2 in the figures) is held in the OFF state while only a second battery-switch 2B (the negative-side battery-switch 2 in the figures) is switched ON. In this state the capacitor 34 is pre-charged by the pre-charge circuit 3. After pre-charging the capacitor 34, the first battery-switch 2A is switched from OFF to ON to connect the driving battery 1 to the vehicle-side load 30. Subsequently, a pre-charge switch 12 in the pre-charge circuit 3 is switched OFF. When turning the battery-switches 2 OFF, both battery-switches 2 are switched OFF together or in sequence.

The pre-charge circuit 3 pre-charges the vehicle-side load 30 capacitor 34 while limiting current. The pre-charge circuit 3 has a pre-charge resistor 11 connected in series with a pre-charge switch 12. The pre-charge resistor 11 limits the pre-charge current delivered to the vehicle-side load 30 capacitor 34. Pre-charge current can be reduced by increasing the resistance of the pre-charge resistor 11. For example, in a power source apparatus with a driving battery 1 with an output voltage of 400V, maximum pre-charge current is limited to 40 A by a pre-charge resistor 11 of 10Ω. Maximum pre-charge current can be reduced by increasing the value of the pre-charge resistor 11. However, as the pre-charge resistor 11 value is increased, the time required to pre-charge the capacitor 34 becomes longer. This is because the pre-charge current becomes small with a large pre-charge resistor 11. The value of the pre-charge resistor 11 is set considering the pre-charging time and pre-charge current value, and for example, is set from 5Ω to 20Ω, preferably from 6.5Ω to 18Ω, and more preferably from 6Ω to 15Ω.

The pre-charge circuit 3 is connected in parallel with a battery-switch 2. The power source apparatus of the figures is provided with battery-switches 2 on both the positive and the negative-sides, and the pre-charge circuit 3 is connected in parallel with the first battery-switch 2A on the positive-side. In this power source apparatus, the capacitor 34 is pre-charged by the pre-charge circuit 3 with the second battery-switch 2B (on the negative-side) in the ON state. When the pre-charge circuit 3 completes pre-charging of the capacitor 34, the first battery-switch 2A (on the positive-side) is switched ON and the pre-charge switch 12 in the pre-charge circuit 3 is turned OFF.

The pre-charge circuit 3 pre-charges the capacitor 34 by turning the pre-charge switch 120N. The pre-charge switch 12 is a mechanical switch such as a relay with contacts. However, a semiconductor switching device such as a bipolar transistor or field-effect transistor (FET) can also be used as the pre-charge switch.

The battery-switches 2 and pre-charge switch 12 are controlled by the control circuit 4. When the ignition switch 36 (ignition key) is in the ON state, the control circuit 4 turns the battery-switches 20N, and when the ignition switch 36 is in the OFF state, the control circuit 4 turns the battery-switches 2 OFF. In addition, under abnormal conditions such as when a collision or driving battery 1 leakage current is detected, the battery-switches 2 are switched OFF even with the ignition switch 36 in the ON state to disconnect the driving battery 1 from the vehicle-side load 30.

The control circuit 4 switches the second battery-switch 2B and the pre-charge switch 120N, and after the vehicle-side load 30 capacitor 34 has been pre-charged, the control circuit 4 switches the first battery-switch 2A ON. The control circuit 4 switches the first battery-switch 2A ON after detecting completion of capacitor 34 pre-charging. The control circuit 4 detects completion of pre-charging when a set time has elapsed after the start of pre-charging, or by detecting vehicle-side load 30 current and/or voltage.

The control circuit 4 is supplied with operating power from the auxiliary battery 35. Accordingly, the control circuit 4 power supply line 5 is connected to the auxiliary battery 35. Further, the control circuit 4 shown in the figures has an electrolytic capacitor 15 connected to the power supply line 5. The auxiliary battery 35 also supplies power to the vehicle's electrical components and accessories. The vehicle is equipped with various electrical accessories, assorted lights and lamps, an air conditioning system, electrically driven power steering, a starter motor, and a sound system, etc. A 12V lead-storage battery is primarily used as the auxiliary battery 35, but 24V lead-storage batteries are also used in larger vehicles. Since the auxiliary battery 35 supplies power to the various electrical components and accessories, its voltage can drop when it is discharged with high currents. When auxiliary battery 35 voltage drops and control circuit 4 power supply line 5 voltage becomes abnormally low, the control circuit 4 can fail to operate properly.

The power source apparatus in FIGS. 1-3 is provided with a supplementary power supply circuit 6 to supply operating power from the driving battery 1 to the control circuit 4 and maintain control circuit 4 operation when auxiliary battery 35 voltage drops. In a voltage drop condition where the voltage of power supplied to the control circuit 4 power supply line 5 by the auxiliary battery 35 decreases, operating power is supplied to the control circuit 4 power supply line 5 from one segment of the batteries 10 that make up the driving battery 2 and control circuit 4 operation is maintained.

The supplementary power supply circuit 6 supplies power to the control circuit 4 power supply line 5 from one segment of the series-connected batteries 10 that make up the driving battery 1 at a voltage that makes the control circuit 4 operational. In a condition where auxiliary battery 35 voltage drops, the supplementary power supply circuit 6 maintains operation of the control circuit 4 to control the battery-switches 20N and OFF normally.

The supplementary power supply circuit 6 does not supply power to the control circuit 4 power supply line 5 that is stepped-down in voltage from the output voltage of the driving battery 1. Rather, the supplementary power supply circuit 6 supplies power to the control circuit 4 from one segment of the batteries 10 that make up the driving battery 1. A lead-storage batteries with a specified voltage of 12V is primarily used as the auxiliary battery 35. In a hybrid vehicle with the ignition switch 36 in the ON state, the auxiliary battery 35 is charged by an engine-driven generator 33, or by driving battery 1 output with the voltage stepped-down by a DC/DC converter. In the charged state, auxiliary battery 35 voltage rises to 13.6V to 14.5V. However, since auxiliary battery 35 charging starts after the ignition switch 36 is switched ON and the control circuit 4 verifies and completes various operations, the auxiliary battery 35 is not always in a charged state when the ignition switch 36 is turned ON. If the auxiliary battery 35 is discharged with high current in an uncharged state, its voltage will drop abnormally low. Further, even if the auxiliary battery 35 is being charged, its output voltage will drop if the discharge current is considerably higher than the charging current. When the auxiliary battery 35 is in a voltage drop condition with abnormally low voltage, the control circuit 4 is supplied with operating power from the driving battery 1 by the supplementary power supply circuit 6.

The number of batteries 10 in the driving battery 1 that are used in the supplementary power supply circuit 6 sets the specified supply voltage of power supplied to the control circuit 4 power supply line 5. If individual nickel hydride batteries have a specified voltage of 1.2V, and lithium ion batteries have a specified voltage of 3.7V, a series-connection of nine batteries in a nickel hydride driving battery 1 can output a specified supply voltage of 10.8V, and ten series-connected nickel hydride batteries can output a specified supply voltage of 12V. Further, a specified supply voltage of 11.1V can be output from three series-connected lithium ion batteries.

Overall circuit structure can be simplified by making the supplementary power supply circuit 6 specified supply voltage, which is the voltage supplied to the control circuit 4 power supply line 5, lower than the auxiliary battery 35 specified supply voltage This is because when auxiliary battery voltage has dropped and operating power is supplied to the control circuit 4 from the driving battery 1, the voltage on the control circuit 4 power supply line 5 does not exceed the specified voltage of the auxiliary battery 35. Since control circuit 4 power supply line 5 voltage does not exceed the specified voltage of the auxiliary battery 35 (when power is supplied to the control circuit 4 from the driving battery 1 in the voltage drop condition), the voltage drop condition can be detected while operating power is being supplied from the driving battery 1 to the control circuit 4.

However, in the power source apparatus of the present invention, the specified supply voltage of the supplementary power supply circuit does not necessarily have to be lower than the specified voltage of the auxiliary battery, and the specified supply voltage of the supplementary power supply circuit could be made higher than the specified voltage of the auxiliary battery. In that case, when auxiliary battery voltage has dropped, the voltage drop condition can be distinguished from the normal condition by detecting the discharge current of the driving battery and auxiliary battery, or by determining the change in voltage on the power supply line.

The supplementary power supply circuit 6 shown in FIG. 1 is provided with a pair of supplementary power switches 7 that connect one segment of the driving battery 1 to the control circuit 4 power supply line 5, a voltage detection circuit 8 that detects auxiliary battery 35 or power supply line 5 voltage, and a decision circuit 9 that discriminates between the voltage drop condition and normal condition based on the voltage detected by the voltage detection circuit 8. The voltage detection circuit 8 is provided with an A/D converter 13 that detects power supply line 5 or auxiliary battery 35 voltage with a given sampling period. The A/D converter 13 detects power supply line 5 or auxiliary battery 35 voltage with a given sampling period, converts the detected voltage to a digital signal, and outputs the digital signal to the decision circuit 9.

In a circuit configured with the auxiliary battery 35 connected directly to the control circuit 4 power supply line 5, the power supply line 5 voltage and the voltage of the auxiliary battery 35 become the same value. However, in a circuit configured with the control circuit 4 power supply line 5 connected to the auxiliary battery 35 through a diode 16 as shown by the broken-line outline in FIG. 1, the auxiliary battery 35 voltage and power supply line 5 voltage are not necessarily the same. For example, if auxiliary battery 35 voltage drops abnormally low and the driving battery 1 supplies operating power to the control circuit 4 power supply line 5, the power supply line 5 voltage will become higher than the voltage of the auxiliary battery 35. Consequently, with this circuit structure, the voltage detection circuit 8 controls the supplementary power switches 7 ON and OFF by detecting the voltage of the auxiliary battery 35 or, as shown by the broken line in the figure, detecting the voltage of the power supply line 5.

Figure 4:
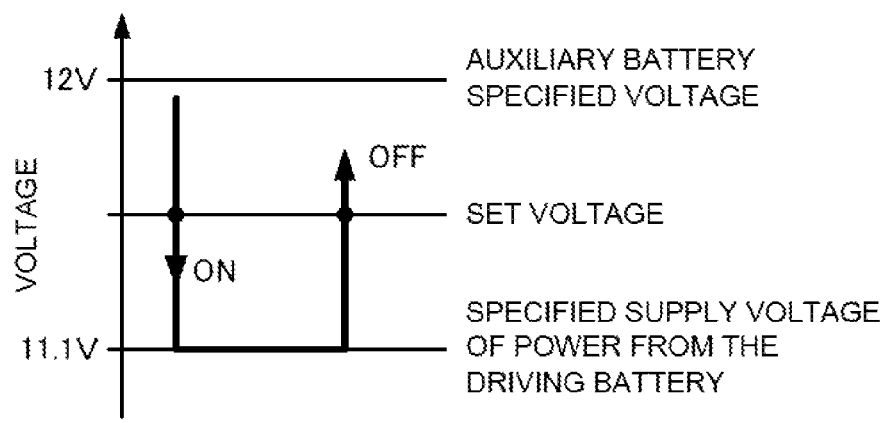
FIG. 4 is a diagram showing one example of the voltage for decision circuit ON and OFF switching of the supplementary power switches.

The decision circuit 9 stores a set voltage in memory to distinguish between the voltage drop condition and normal conditions. The set voltage stored in the decision circuit 9 is set higher than the specified supply voltage of the supplementary power supply circuit 6 and lower than the specified voltage of the auxiliary battery 35. FIG. 4 shows the set voltage for decision circuit 90N and OFF switching of the supplementary power switches 7. The set voltage for this decision circuit 9 is below the specified voltage of the auxiliary battery 35 (12V) and above the specified supply voltage of power supplied from the driving battery 1 (11.1V). Here, the voltage detection circuit 8 detects the voltage of the auxiliary battery 35 or the power supply line 5, and if the detected voltage drops below the set voltage, the decision circuit 9 judges a voltage drop condition and switches the supplementary power switches 7 ON to supply operating power from the driving battery 1 to the control circuit 4. In this state, operating power is supplied from the driving battery 1 to the control circuit 4 power supply line 5 to put the control circuit 4 in an operating state. However, since the power supplied from the driving battery 1 to the control circuit 4 is at a voltage lower than the set voltage, the voltage detected by the voltage detection circuit 8 is below the set voltage. Consequently, while operating power is being supplied from the driving battery 1 to the control circuit 4, the decision circuit 9 judges that auxiliary battery 35 voltage is still low and the supplementary power switches 7 are maintained in the ON state to continue supplying operating power from the driving battery 1 to the control circuit 4. When auxiliary battery 35 voltage rises above the set voltage, normal conditions are judged based on the fact that the detected voltage of the auxiliary battery 35 is greater than the set voltage. Accordingly, the supplementary power switches 7 are switched OFF and power is cut-off from the driving battery 1 to the control circuit 4.

Figure 5:
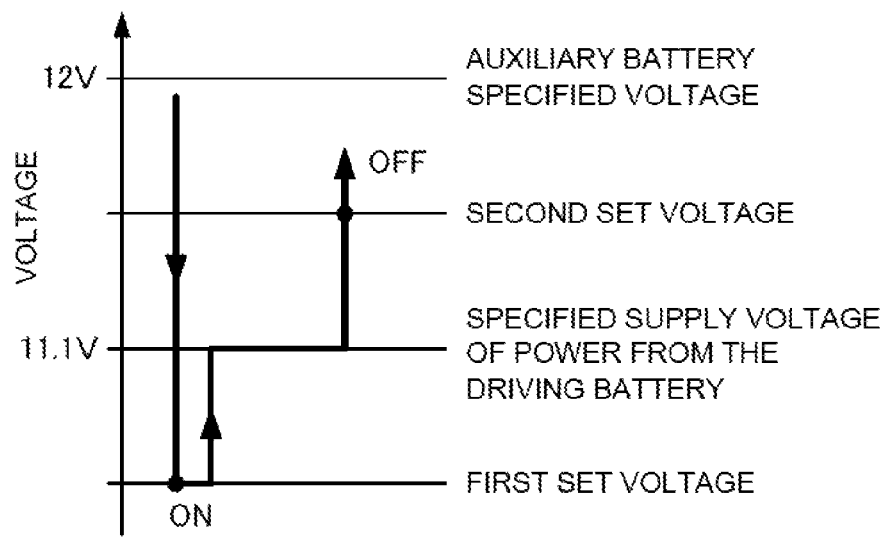
FIG. 5 is a diagram showing another example of voltages for decision circuit ON and OFF switching of the supplementary power switches.

Turning to FIG. 5, supplementary power switch 7 ON and OFF switching is shown for a decision circuit 9 that stores different set voltages for switching the supplementary power switches 7 ON and OFF. If auxiliary battery 35 voltage drops below a first set voltage that is lower than the driving battery 1 specified supply voltage (11.1V), this decision circuit 9 switches the supplementary power switches 7 ON to supply operating power from the driving battery 1 to the control circuit 4. When the supplementary power switches 7 are turned ON, power supply line 5 voltage rises to the driving battery 1 specified supply voltage, but the decision circuit 9 does not switch the supplementary power switches 7 OFF under these conditions. When auxiliary battery 35 voltage rises above a second set voltage that is higher than the driving battery specified supply voltage (11.1V) but lower than the auxiliary battery specified voltage (12V), the decision circuit 9 switches the supplementary power switches 7 OFF to supply operating power from the auxiliary battery 35 to the control circuit 4.

Further, after an auxiliary battery 35 voltage drop condition has been detected, the decision circuit 9 can maintain the supplementary power switches 7 in the ON state for a given period. With the supplementary power switches 7 in the ON state, the voltage detection circuit 8 can detect power supply line 5 or auxiliary battery 35 voltage with a given sampling period. The decision circuit 9 can then determine the change in detected voltage, distinguish the voltage drop condition from normal conditions, and control the supplementary power switches 7 ON and OFF. This is because in the voltage drop condition with the supplementary power switches 7 ON, when both the driving battery 1 and the auxiliary battery 35 are supplying power to the control circuit 4 power supply line 5 and auxiliary battery 35 voltage rises, power supply line 5 voltage will rise. The decision circuit 9 can detect that rise in voltage and can detect the return to normal conditions from the voltage drop condition.

In the power source apparatus described above, since operating power is supplied to the control circuit 4 from the driving battery 1 through a pair of supplementary power switches 7, the driving battery 1 is not connected with the vehicle chassis ground 14 when the supplementary power switches 7 are in the OFF state. Accordingly, this circuit architecture is appropriate for use in power source apparatus with a driving battery 1 that is not connected with the vehicle chassis ground. When the control circuit 4 is supplied with operating power from the driving battery 1, the driving battery 1 is temporarily connected to chassis ground. However, since the driving battery 1 temporarily supplies operating power to the control circuit 4 over a short period, from a practical standpoint there are no detrimental effects due to temporary connection of the driving battery 1 with chassis ground.

Turning to the power source apparatus in FIG. 2, operating power is supplied to the control circuit 4 from the supplementary power supply circuit 6 through a diode 17, and operating power is also supplied to the control circuit 4 from the auxiliary battery 35 through a diode 16. The diode 17 connected to the driving battery 1 is connected with a polarity that enables operating power to be supplied from the driving battery 1 to the control circuit 4, and the diode 16 connected to the auxiliary battery 35 is connected with a polarity that enables operating power to be supplied from the auxiliary battery 35 to the control circuit 4.

In the power source apparatus of FIG. 2, the specified supply voltage of the supplementary power supply circuit 6, which supplies power from the driving battery 1 to the control circuit 4, is set lower than the specified voltage of the auxiliary battery 35. For example, by supplying operating power to the control circuit 4 from a series-connection of three lithium ion batteries 10, the supplementary power supply circuit 6 specified supply voltage is 11.1V while the auxiliary battery 35 is a lead-storage battery with a nominal voltage of 12V. With this supplementary power supply circuit 6, if auxiliary battery 35 voltage drops, operating power is supplied through the diode 17 from the driving battery 1 to the control circuit 4 power supply line 5. Here, the diode 17 connected to the driving battery 1 does not pass current in the reverse direction, and there is no current flow from the auxiliary battery 35 to the driving battery 1. When auxiliary battery 35 voltage rises above the driving battery 1 specified supply voltage and returns to normal conditions, operating power is supplied from the auxiliary battery 35 to the control circuit 4.

The power source apparatus described above can supply operating power from the driving battery 1 to the control circuit 4 during an auxiliary battery 35 voltage drop condition with a simple circuit structure. In this power source apparatus, the ground line 18 of the driving battery 1 is connected to the negative-side of the control circuit 4, which is the vehicle chassis ground 14. Namely, the driving battery 1 is connected with chassis ground 14. For high output voltage driving batteries of several hundred volts, the ground line should be insulated from the vehicle chassis ground to prevent electrical shock. Therefore, a power source apparatus that connects the ground line 18 with chassis ground 14 is suitable for low voltage driving battery 1 applications such as with driving batteries 1 of 60V or less.

Turning to the power source apparatus of FIG. 3, current supplied from the auxiliary battery 35 to the control circuit 4 is detected to detect auxiliary battery 35 recovery to normal conditions from a voltage drop condition. This power source apparatus is provided with a current detection circuit 20 that detects auxiliary battery 35 supply current, a voltage detection circuit 8 that detects auxiliary battery 35 voltage, and a decision circuit 9 that distinguishes between the voltage drop condition and normal conditions based on signals from the voltage detection circuit 8 and current detection circuit 20. In this power source apparatus as well, the specified supply voltage of the supplementary power supply circuit 6, which is the voltage supplied from the driving battery 1 to the control circuit 4, is set lower than the specified voltage of the auxiliary battery 35. Specifically, control circuit 4 power supply line 5 voltage in the auxiliary battery 35 voltage drop condition is lower than power supply line 5 voltage under normal conditions.

The current detection circuit 20 is provided with a difference amplifier 22 that amplifies the voltage across a current detection resistor 21, and an A/D converter 23 that converts difference amplifier 22 analog output to digital signals. The A/D converter 23 converts input from the difference amplifier 22 to digital signals with a given sampling period and outputs those signals to the decision circuit 9. The voltage detection circuit 8 is also provided with an A/D converter 13 that converts auxiliary battery 35 voltage to digital signals with a given sampling period and outputs those signals to the decision circuit 9.

The decision circuit 9 compares digital signals from the voltage detection circuit 8, which represent the detected voltage of the auxiliary battery 35, with a set voltage to detect auxiliary battery 35 voltage drop. The decision circuit 9 judges auxiliary battery 35 voltage drop when the detected voltage input from the voltage detection circuit 8 is lower than the set voltage. When the decision circuit 9 judges a voltage drop condition, it switches ON the supplementary power switches 7 to supply operating power from the driving battery 1 to the control circuit 4. In the auxiliary battery 35 voltage drop condition, the control circuit 4 is maintained in an operating state with operating power supplied by the driving battery 1. While in the voltage drop condition, the decision circuit 9 compares auxiliary battery 35 supply current, which is input as digital signals from current detection circuit 20 A/D converter 23, with a set current. In the voltage drop condition, current is supplied to the control circuit 4 from the driving battery 1 because the auxiliary battery 35 voltage is low. Consequently, in the voltage drop condition, auxiliary battery 35 supply current is lower than the set current. When auxiliary battery 35 voltage rises to a state where the auxiliary battery 35 can again supply operating power to the control circuit 4, auxiliary battery 35 supply current will increase. Accordingly, the decision circuit 9 compares auxiliary battery 35 supply current with the set current and detects recovery from the voltage drop condition to normal conditions. When normal conditions are detected, the decision circuit 9 switches OFF the supplementary power switches 7 to supply operating power to the control circuit 4 from the auxiliary battery 35 only.

In the power source apparatus of FIG. 3, since the supplementary power switches 7 are switched OFF by direct detection of the operating power supplied from the auxiliary battery 35 to the control circuit 4, recovery to normal conditions can be detected reliably to turn OFF the supplementary power switches 7.

The power source apparatus described above can be used as a power source on-board a vehicle. An electric powered vehicle such as a hybrid vehicle driven by both an engine and an electric motor, a plug-in hybrid vehicle, or an electric vehicle driven by an electric motor only can be equipped with the power source apparatus and use it as an on-board power source.

(Power Source Apparatus in a Hybrid Vehicle Application)

Figure 6:
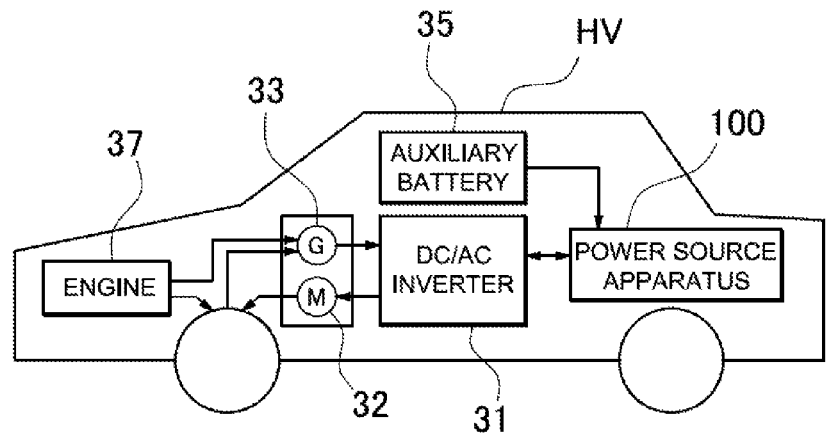
FIG. 6 is a block diagram showing an example of a hybrid vehicle, which is driven by a motor and an engine, equipped with the power source apparatus.

FIG. 6 shows an example of power source apparatus installation on-board a hybrid vehicle, which is driven by both an engine and an electric motor. The vehicle HV equipped with the power source apparatus shown in this figure is provided with an engine 37 and a driving motor 32 to drive the vehicle HV, a power source apparatus 100 to supply power to the motor 32, and a generator 33 to charge the power source apparatus 100 batteries. The power source apparatus 100 is connected to the motor 32 and generator 33 via a DC/AC inverter 31. The vehicle HV runs on both the motor 32 and engine 37 while charging the batteries in the power source apparatus 100. In operating modes where engine efficiency is poor such as during acceleration and low speed cruise, the vehicle is driven by the motor 32. The motor 32 operates on power supplied from the power source apparatus 100. The generator 33 is driven by the engine 37 or by regenerative braking when the vehicle brake pedal is pressed and operates to charge the power source apparatus 100 batteries.

(Power Source Apparatus in an Electric Vehicle Application)

Figure 7:
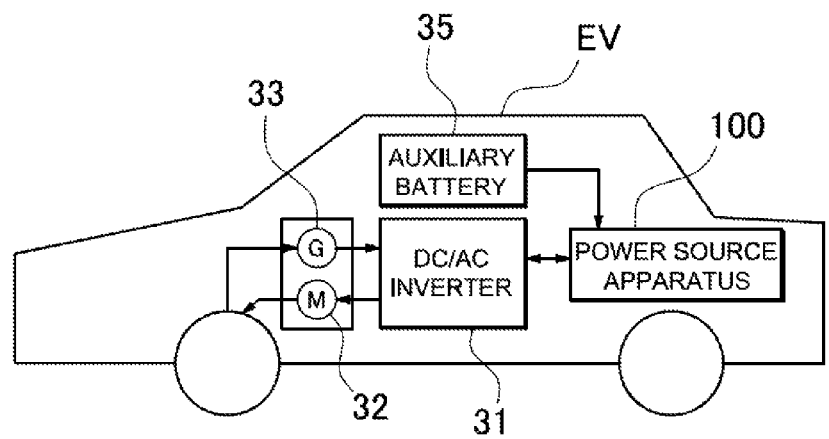
FIG. 7 is a block diagram showing an example of an electric vehicle, which is driven by a motor only, equipped with the power source apparatus.

FIG. 7 shows an example of power source apparatus installation on-board an electric vehicle, which is driven by an electric motor only. The vehicle EV equipped with the power source apparatus 100 shown in this figure is provided with a driving motor 32 to drive the vehicle EV, a power source apparatus 100 to supply power to the motor 32, and a generator 33 to charge the power source apparatus 100 batteries. The power source apparatus 100 is connected to the motor 32 and generator 33 via a DC/AC inverter 31. The motor 32 operates on power supplied from the power source apparatus 100. The generator 33 is driven by energy from regenerative braking and operates to charge the power source apparatus 100 batteries.

INDUSTRIAL APPLICABILITY

The car power source apparatus of the present invention can be appropriately used as a power source apparatus in a vehicle such as a plug-in hybrid electric vehicle that can switch between an electric vehicle mode and a hybrid vehicle mode, a hybrid (electric) vehicle, and an electric vehicle. It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2011-236416 filed in Japan on Oct. 27, 2011, the content of which is incorporated herein by reference.

What is claimed is:

1. A car power source apparatus comprising:
a driving battery having a plurality of batteries connected in series to supply power to a vehicle driving motor;
battery-switches that connect the driving battery to a vehicle-side load;
a control circuit that controls the battery-switches;
an auxiliary battery that supplies operating power to the control circuit power supply line, and
a supplementary power supply circuit that supplies operating power to the control circuit power supply line from a segment of the batteries of the driving battery and that maintains control circuit operation if supply voltage drops in the auxiliary battery power supplied to the control circuit power supply line,
wherein the supplementary power supply circuit supplies operating power to the control circuit power supply line at the control circuit operating voltage from one segment of the batteries of the driving battery, such that in an auxiliary battery voltage drop condition, control circuit operation is maintained to maintain control of the battery-switches,
wherein the supplementary power supply circuit includes supplementary power switches that are switched ON in an auxiliary battery voltage drop condition, a voltage detection circuit that detects the voltage on the control circuit power supply line or the voltage of the auxiliary battery, and a decision circuit that judges a voltage drop condition when the voltage detected by the voltage detection circuit is below a first set voltage, and judges normal conditions when the detected voltage is above a second set voltage,
wherein in the voltage drop condition, the decision circuit switches ON the supplementary power switches to supply operating power from one segment of the driving battery to the control circuit power supply line, and
wherein under normal conditions, the decision circuit switches the supplementary power switches to the OFF state to supply operating power from the auxiliary battery to the control circuit power supply line.

2. The car power source apparatus as recited in claim 1,
wherein the supplementary power switches connect said one segment of the driving battery with the control circuit power supply line, and
wherein in the auxiliary battery voltage drop condition, the supplementary power switches are switched ON to supply operating power to the control circuit power supply line from one segment of batteries in the driving battery.

3. The car power source apparatus as recited in claim 1 wherein the specified supply voltage of the supplementary power supply circuit that supplies power from the driving battery to the control circuit power supply line is lower than the specified voltage of the auxiliary battery.

4. The car power source apparatus as recited in claim 1, wherein the first set voltage and the second set voltage are the same and are higher than the specified supply voltage of the supplementary power supply circuit and lower than the specified voltage of the auxiliary battery.

5. The car power source apparatus as recited in claim 1, further comprising:
an electrolytic capacitor connected to the control circuit power supply line, and
an A/D converter provided in the voltage detection circuit to detect power supply line voltage or auxiliary battery voltage with a given sampling period,
wherein the decision circuit discriminates between the voltage drop condition and normal conditions based on digital signals output from the A/D converter,
wherein the specified supply voltage of the supplementary power supply circuit is set lower than the specified voltage of the auxiliary battery, and
wherein the supplementary power switches are maintained in the ON state for a given period when the decision circuit judges a voltage drop condition; with the supplementary power switches in the ON state, the A/D converter detects the power supply line voltage or auxiliary battery voltage with a given sampling period; and the decision circuit determines the change in detected voltage, discriminates between the voltage drop condition and normal conditions from the change in detected voltage, and controls the supplementary power switches ON or OFF.

6. The car power source apparatus as recited in claim 1, wherein the specified supply voltage of the supplementary power supply circuit is lower than the specified voltage of the auxiliary battery, and
wherein the supplementary power supply circuit supplies power to the control circuit power supply line from one segment of batteries in the driving battery through a diode; and the auxiliary battery supplies operating power to the control circuit power supply line through another diode.

7. The car power source apparatus as recited in claim 1 wherein the control circuit power supply line is connected to the auxiliary battery through a diode, and the diode is connected with a polarity that only allows power to be supplied from the auxiliary battery to the power supply line and does not allow power to be supplied from the power supply line to the auxiliary battery.

8. A vehicle equipped with the power source apparatus as recited in claim 1.

9. The car power source apparatus as recited in claim 1, wherein the first set voltage and the second set voltage are the same.

10. A car power source apparatus comprising:
a driving battery having a plurality of batteries connected in series to supply power to a vehicle driving motor;
battery-switches that connect the driving battery to a vehicle-side load;
a control circuit that controls the battery-switches;
an auxiliary battery that supplies operating power to the control circuit power supply line, and
a supplementary power supply circuit that supplies operating power to the control circuit power supply line from a segment of the batteries of the driving battery and that maintains control circuit operation if supply voltage drops in the auxiliary battery power supplied to the control circuit power supply line,
wherein the supplementary power supply circuit supplies operating power to the control circuit power supply line at the control circuit operating voltage from one segment of the batteries of the driving battery, such that in an auxiliary battery voltage drop condition, control circuit operation is maintained to maintain control of the battery-switches,
wherein the specified supply voltage of the supplementary power supply circuit is lower than the specified voltage of the auxiliary battery, and
wherein the supplementary power supply circuit supplies power to the control circuit power supply line from one segment of batteries in the driving battery through a first diode; and the auxiliary battery supplies operating power to the control circuit power supply line through a second diode.

11. The car power source apparatus as recited in claim 10, wherein the supplementary power supply circuit is provided with supplementary power switches that connect said one segment of the driving battery with the control circuit power supply line, and
wherein in the auxiliary battery voltage drop condition, the supplementary power switches are switched ON to supply operating power to the control circuit power supply line from one segment of batteries in the driving battery.

12. The car power source apparatus as recited in claim 10 wherein the specified supply voltage of the supplementary power supply circuit that supplies power from the driving battery to the control circuit power supply line is lower than the specified voltage of the auxiliary battery.

13. The car power source apparatus as recited in claim 10, wherein the supplementary power supply circuit includes supplementary power switches that are switched ON in the auxiliary battery voltage drop condition, a voltage detection circuit that detects the voltage on the control circuit power supply line or the voltage of the auxiliary battery, and a decision circuit that judges a voltage drop condition when the voltage detected by the voltage detection circuit is below a set voltage, and judges normal conditions when the detected voltage is above the set voltage,
wherein in the voltage drop condition, the decision circuit switches ON the supplementary power switches to supply operating power from one segment of the driving battery to the control circuit power supply line,
wherein under normal conditions, the decision circuit switches the supplementary power switches to the OFF state to supply operating power from the auxiliary battery to the control circuit power supply line, and
wherein the set voltage for decision circuit discrimination between the voltage drop condition and normal conditions is set higher than the specified supply voltage of the supplementary power supply circuit and set lower than the specified voltage of the auxiliary battery.

14. The car power source apparatus as recited in claim 10, wherein the supplementary power supply circuit includes supplementary power switches that are switched ON in the auxiliary battery voltage drop condition, a voltage detection circuit that detects the voltage on the control circuit power supply line or the voltage of the auxiliary battery, and a decision circuit that judges a voltage drop condition when the voltage detected by the voltage detection circuit is below a first set voltage, and judges normal conditions when the detected voltage is above a second set voltage,
wherein in the voltage drop condition, the decision circuit switches ON the supplementary power switches to supply operating power from one segment of the driving battery to the control circuit power supply line,
wherein under normal conditions, the decision circuit switches the supplementary power switches to the OFF state to supply operating power from the auxiliary battery to the control circuit power supply line, wherein the car power source apparatus further comprises:
an electrolytic capacitor connected to the control circuit power supply line, and
an A/D converter provided in the voltage detection circuit to detect power supply line voltage or auxiliary battery voltage with a given sampling period,
wherein the decision circuit discriminates between the voltage drop condition and normal conditions based on digital signals output from the A/D converter,
wherein the specified supply voltage of the supplementary power supply circuit is set lower than the specified voltage of the auxiliary battery, and
wherein the supplementary power switches are maintained in the ON state for a given period when the decision circuit judges a voltage drop condition; with the supplementary power switches in the ON state, the A/D converter detects the power supply line voltage or auxiliary battery voltage with a given sampling period; and the decision circuit determines the change in detected voltage, discriminates between the voltage drop condition and normal conditions from the change in detected voltage, and controls the supplementary power switches ON or OFF.

15. The car power source apparatus as recited in claim 14, wherein the first set voltage and the second set voltage are the same.

16. The car power source apparatus as recited in claim 10 wherein the control circuit power supply line is connected to the auxiliary battery through the second diode, and the second diode is connected with a polarity that only allows power to be supplied from the auxiliary battery to the power supply line and does not allow power to be supplied from the power supply line to the auxiliary battery.

17. A vehicle equipped with the power source apparatus as recited in claim 10.

* * * * *